Feb. 8, 1949.   C. R. SODERBERG   2,461,243
DIAPHRAGM SEAL FOR TURBINES
Filed Aug. 23, 1944   2 Sheets-Sheet 1

FIG. I

INVENTOR
Carl R. Soderberg

INVENTOR
Carl R. Soderberg

Patented Feb. 8, 1949

2,461,243

UNITED STATES PATENT OFFICE 2,461,243

DIAPHRAGM SEAL FOR TURBINES

Carl R. Soderberg, Weston, Mass., assignor to United Aircraft Corporation, East Hartford, Conn., a corporation of Delaware Application August 23, 1944, Serial No. 550,900

2 Claims. (Cl. 253—69)

This invention relates to diaphragm seals for turbines.

The seal at the inner edge of the turbine diaphragm consists usually of a split ring carried by the diaphragm and having one or more radially extending flanges, the inner edges of which are closely spaced from the rotor and define throttling passage. Leakage past these seals is considerable because of the absence both of a number of throttling passages and a number of changes in direction of flow through the seal. An object of this invention is to overcome this objection by using a Ljungstrom type of seal at the inner edge of the diaphragm.

Because of the interfitting cylindrical sleeves in a Ljungstrom type seal it has been impossible to assemble this type of seal on the turbine diaphragm if the turbine casing is split for radial assembly on the rotor. A feature of this invention is an arrangement of the rotor and casing to permit assembly of a seal of this type.

A feature of the invention is a labyrinth seal for the turbine diaphragm having interfitting substantially cylindrical elements mounted on the rotor and diaphragm. Another feature is the use of continuous seal members rather than split seal members.

Other objects and advantages will be apparent from the specification and claims, and from the accompanying drawings which illustrate an embodiment of the invention.

Figure 1:
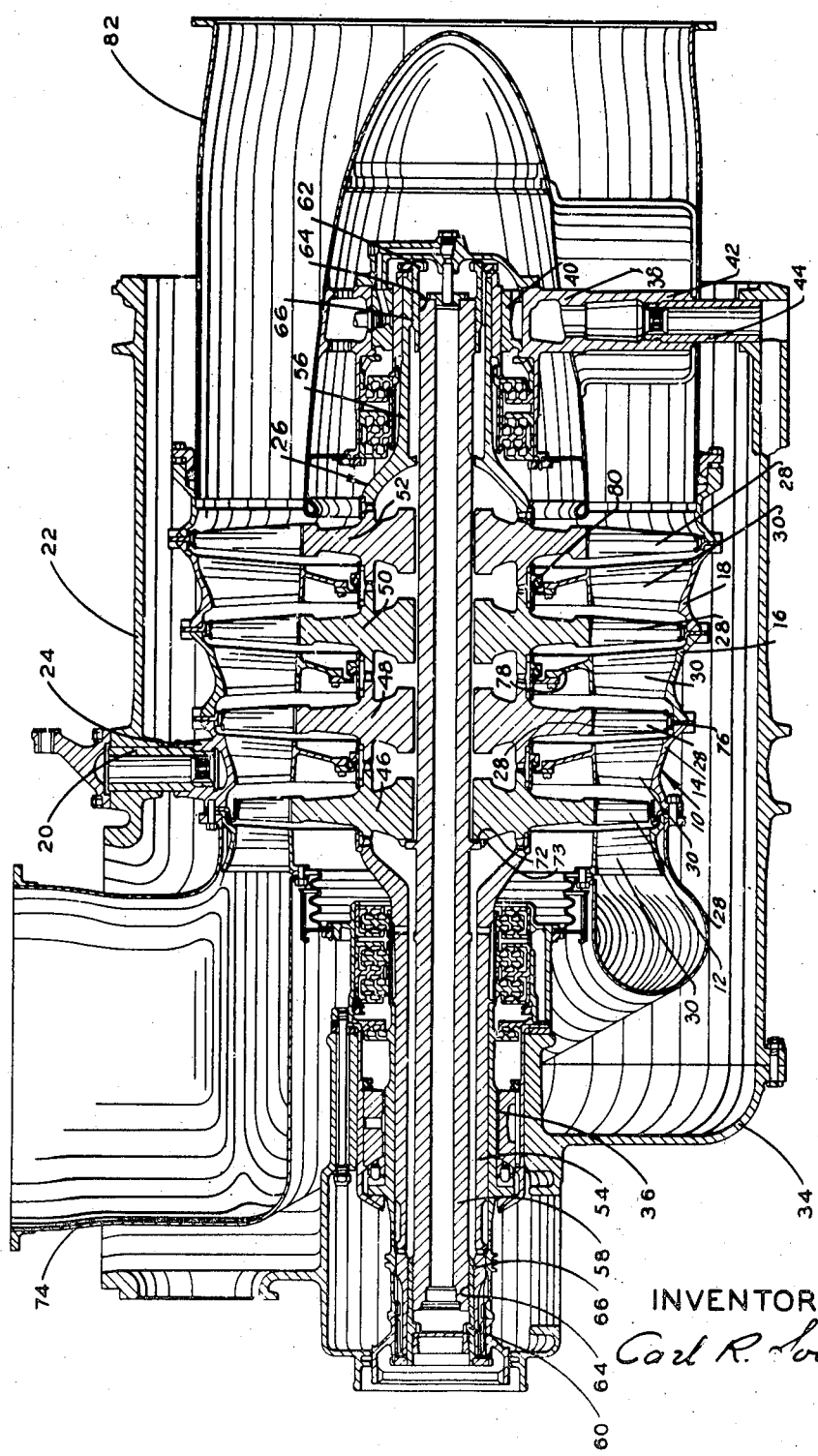
Fig. 1 is a sectional view through the turbine.
Figure 2:
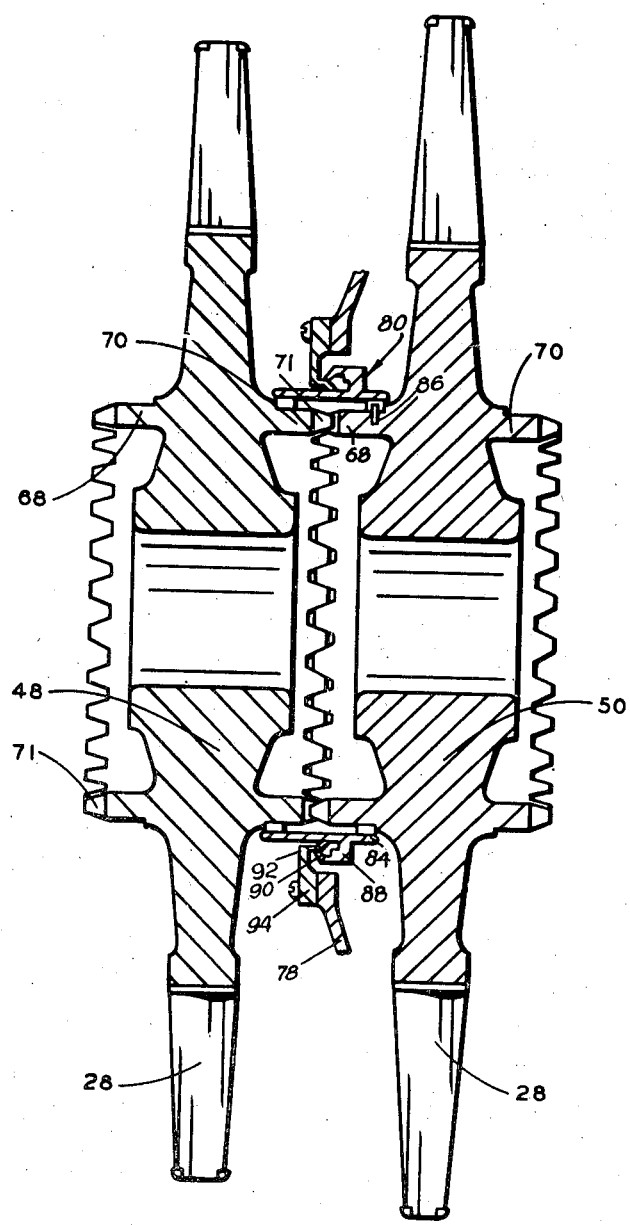
Fig. 2 is a sectional view on a larger scale of the diaphragm seal.

The turbine shown includes a casing 10 built up of rings 12, 14, 16 and 18 supported by radial pins 20 in a housing 22. These pins which are all in substantially the same plane and which constitute the support for the casing within the housing, engage bores in bosses 24 in one ring 14 of the casing. Rotor 26 within the casing has a number of rows of blades 28 alternating with the rows of nozzles 30 in the casing.

Housing 22 has a head 34 which forms a part of the housing and supports a bearing sleeve 36 for the front end of rotor 26. At the other end of the turbine, the housing 22 supports a mounting 38 within which is a bearing 40 for the rotor. Mounting 38 has a number of legs 42 engaging with radial pins 44 which locate the mounting within the housing.

Rotor 26 is made up of a number of discs, 46, 48, 50 and 52, each of which is substantially a constant stress disc, and shaft-forming end elements 54 and 56. The discs and the shaft elements are all held together by a central bolt 58. The ends of the bolt are positioned within the end elements 54 and 56 and are connected to the end elements by threaded sleeves 60 and 62. Each sleeve 60, 62 has inner and outer threads 64 and 66 engaging respectively with cooperating threads on the bolt and on the end elements. On one of the sleeves (sleeve 60 as shown) the inner and outer threads may differ in pitch so that as the ring is screwed into place, a substantial tension may be applied to the bolt.

Since the casing is built up of casing rings bolted together each having a row of nozzles, and since the rotor is built up of discs, each having a row of blades, it is apparent that the turbine is adapted for endwise assembly. To assist in aligning the discs and to prevent relative rotation in operation during assembly, each disc has projecting annular flanges 68 and 70 on opposite sides having interengaging elements preferably in the form of face splines 71 cooperating with similar elements on the adjoining disc. Similarly, the inner ends of shaft elements 54 and 56 have face splines cooperating with splines 71 on the end discs. Stability of the rotor may be maintained by projections 72 on the bolt engaging radial slots 73 in disc 46.

Gas enters the first stage nozzles of the turbine through an inlet scroll 74 which is bolted on or otherwise attached to the end of casing 10. Leakage of power gas past the outer ends of the blades is prevented by seals 76 which may be positioned between adjoining casing rings. Leakage of power gas past the inner edges of the diaphragm 78 extending inwardly from each row of nozzles is prevented by a labyrinth seal 80. Gas from the turbine discharges through a duct 82 connected to the end casing ring and surrounding the rear bearing mounting.

The diaphragm seal between successive stages of the turbine rotor is a Ljungstrom type of seal and includes a ring 84 mounted on the outer surfaces of the opposed flanges 68 and 70 of adjoining discs. This ring, which may be locked against rotation by a pin 86 extending from one of the flanges, has an integral cylindrical flange 88 on its outer surface with the free end of the flange forming an inwardly extending sealing rib 90. Cooperating with sealing rib 90 is a cylindrical flange 92 on a ring 94 attached to the inner periphery of the diaphragm 78. Flange 92 has its free edge located between flange 88 and ring 84 so that sealing rib 90 may engage the outer surface of flange 92. An inwardly extending sealing rib on flange 92 may engage the outer surface of ring 84.

Since the rotor is split and since the casing is built up of a number of annular rings, it is apparent that this type of seal, which requires axial assembly, may be mounted between the adjoining turbine discs, as shown, during assembly of the turbine. Both rings 84 and 94 may, as a result, be continuous unsplit structures.

It is to be understood that the invention is not limited to the specific embodiment herein illustrated and described, but may be used in other ways without departure from its spirit as defined by the following claims.

I claim:

1. A turbine rotor including a number of discs each having a row of blades extending substantially radially from the periphery thereof, and each having annular flanges on opposite sides thereof concentric to the discs, each of said discs having a central opening with the annular flanges of such a dimension as to be radially spaced between the central opening and the periphery of the discs, said flanges being in interengagement and having means thereon for piloting the discs with respect to one another, and means extending through the central openings in the discs and holding said discs in endwise engagement, an annular sealing element located between adjoining discs and supported on the outer surfaces of said flanges, said sealing element being in the form substantially of a cylinder having engagement with both of the flanges adjacent thereto, and a cylindrical sealing flange connected to and spaced from the outer periphery of the cylinder, in combination with a turbine casing having rows of nozzles alternating with the rows of blades, and diaphragms extending inwardly from the nozzles and located between adjoining discs, and a sealing element carried by each diaphragm having a substantially cylindrical flange fitting between the flange on the rotor sealing element and the outer periphery of the cylinder part of the rotor sealing element.

2. A turbine rotor including a number of discs each having a row of blades extending substantially radially from the periphery thereof, and each having annular flanges on opposite sides thereof concentric to the discs, each of said discs having a central opening with the annular flanges of such a dimension as to be radially spaced between the central opening and the periphery of the discs, said flanges being in interengagement and having means thereon for piloting the discs with respect to one another, and means extending through the central openings in the discs and holding said discs in endwise engagement, an annular sealing element located between adjoining discs and supported on the outer surfaces of said flanges, said sealing element being in the form substantially of an unsplit cylinder having engagement with both of said flanges, and a cylindrical flange connected to and spaced from the outer periphery of the cylinder, in combination with a turbine casing having a number of rings each having a row of nozzles alternating with the rows of blades, and diaphragms extending inwardly from the nozzles and located between adjoining discs, and a sealing element in the form of a continuous ring carried by each diaphragm and having a substantially cylindrical flange thereon to fit between the sealing flange and the outer periphery of the cylinder part of the sealing element on the rotor.

CARL R. SODERBERG.

REFERENCES CITED

The following references are of record in the file of this patent:

UNITED STATES PATENTS

| Number | Name | Date |
| --- | --- | --- |
| 1,267,229 | Junggren | May 21, 1918 |
| 1,855,890 | Phillips | Apr. 26, 1932 |
| 1,882,267 | Wiberg | Oct. 11, 1932 |
| 2,200,287 | Lysholm | May 14, 1940 |
| 2,244,467 | Lysholm | June 3, 1941 |
| 2,282,894 | Sheldon | May 12, 1942 |
| 2,415,104 | Ledwith | Feb. 4, 1947 |